United States Patent
Oroku et al.

(10) Patent No.: US 8,035,522 B2
(45) Date of Patent: Oct. 11, 2011

(54) RFID TAG

(75) Inventors: Noriyuki Oroku, Takasaki (JP); Naoya Kanda, Fujisawa (JP); Hidehiko Kando, Matsudo (JP); Kouichi Uesaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 12/233,900

(22) Filed: Sep. 19, 2008

(65) Prior Publication Data

US 2009/0079574 A1    Mar. 26, 2009

(30) Foreign Application Priority Data

Sep. 19, 2007    (JP) ................................. 2007-241732

(51) Int. Cl.
*G08B 13/14*    (2006.01)
(52) U.S. Cl. .................. 340/572.7; 340/572.1
(58) Field of Classification Search .... 340/572.1–572.8; 235/441, 492; 343/895, 702
See application file for complete search history.

(56) References Cited

U.S. PATENT DOCUMENTS

| | | | |
|---|---|---|---|
| 5,528,222 A | | 6/1996 | Moskowitz et al. |
| 6,634,564 B2 * | | 10/2003 | Kuramochi ................... 235/492 |
| 2004/0125040 A1 | | 7/2004 | Ferguson et al. |
| 2005/0173541 A1 | | 8/2005 | Inoue et al. |
| 2006/0012482 A1 * | | 1/2006 | Zalud et al. ................. 340/572.7 |

FOREIGN PATENT DOCUMENTS

| | | |
|---|---|---|
| CN | 1754283 | 3/2006 |
| JP | 8-88586 | 4/1996 |
| JP | 08-088586 | 4/1996 |
| JP | 2002-152076 | 5/2002 |
| JP | 2003-218624 | 7/2003 |
| JP | 2004-295466 | 10/2004 |
| JP | 2005-222299 | 8/2005 |
| JP | 2008-004655 | 1/2008 |
| JP | 2008-041005 | 2/2008 |
| JP | 2008-085257 | 4/2008 |

OTHER PUBLICATIONS

Office Action in Korean Patent Application 9-5-2010-036989 125; dated Aug. 24, 2010 (in Korean); [4 pages].
Office Action in Chinese Patent Application 100037; dated May 31, 2010 (in Chinese); [3 pages].

* cited by examiner

*Primary Examiner* — Anh V La
(74) *Attorney, Agent, or Firm* — Antonelli, Terry, Stout & Kraus, LLP.

(57) ABSTRACT

A circuit chip having a loop-shaped antenna coil on a main surface and a tag sheet having an antenna pattern on a main surface are prepared, and the circuit chip is mounted on the main surface of the tag sheet so as not to place over the antenna pattern. The circuit chip is placed closely to the antenna pattern, and at least the half of the main surface is desirably faced against the antenna pattern. Thus, signals and/or power can be securely exchanged between the circuit chip (or antenna coil) and the antenna pattern. Therefore, a high-performance and rigid RFID tag can be obtained by roughly aligning the circuit chip and the tag sheet.

17 Claims, 10 Drawing Sheets

RFID TAG

The present application claims priority from Japanese application JP 2007-241732 filed on Sep. 19, 2007, the content of which is hereby incorporated by reference into this application.

BACKGROUND OF THE INVENTION

1. Field of the Invention

The present invention relates to a structure of an RFID tag and a manufacturing process for an RFID tag.

2. Description of the Related Art

A conventional semiconductor apparatus has a structure in which multiple connection terminals on a surface of an IC chip are contact-fixed to and electrically connected to a connection part of an antenna sheet of an RFID tag, as disclosed in JP-A-8-88586, which requires precise alignment and fixing of the connection terminals of the IC chip and the connection part of the antenna sheet. For that reason, if the IC chip is finer, the connection terminals are necessarily finer and must be placed closely to each other, requiring high precision is required for the alignment. In order to implement the electrical connection securely, the IC chip must be placed with the surface having the connection terminals faced against the connection part of the antenna sheet, and not only the position of the IC chip but also the front and back and/or orientation must be adjusted securely about the antenna sheet. As a result, a flip chip bonder, which is expensive and has a slow takt time, must be used to mount the IC chip to the antenna sheet, which disadvantageously increases the manufacturing costs.

Patent Document 1: JP-A-8-88586

SUMMARY OF THE INVENTION

In the conventional setting and connection method by electric connection, fine and mutually close connection terminals on an IC chip must be aligned and fixed to and securely electrically connected to the connection part of an antenna sheet. Therefore, an apparatus must be used for aligning and mounting an IC chip to an antenna sheet with high precision, which increases the costs of the volume production of RFID tags and decreases the productivity. Furthermore, incomplete connection between the connection part of an antenna sheet and connection terminals on an IC chip may inhibit the mutual flow of current. Therefore, in order to prevent the application of external force when an RFID tag is used, the connection parts of the terminals must be protected more rigidly with a resin mold or an underfill material. However, the reinforcement of an RFID tag in that way prevents a sufficient decrease in thickness and deteriorates the flexibility.

Accordingly, it is an object of the present invention to provide a thin and flexible RFID tag at low costs with simple circuit protection means, which can greatly alleviate the precision for mounting and alignment, since it does not require the electric connection between an IC chip and an antenna sheet.

According to the invention, a minute conductive loop structure is provided on an IC chip for RFID, and the IC chip is placed near the part having a highest current density of an antenna circuit on an antenna sheet. Thus, an external electromagnetic wave signal is resonated on the antenna circuit, and the resulting electromagnetic field is concentrated into the part (near the IC chip) to electromagnetically connect to an antenna (which is the conductive loop structure or capacitor structure) on the IC chip. Thus, signals or power can be exchanged between an external circuit of the RFID tag and the IC chip. This structure even allows an antenna on a minute IC chip, which is incapable of exchanging sufficient power from the surroundings alone, to exchange strong signals or power with the outside. Since the contact as an electric circuit is not required between the IC chip and the antenna sheet, the precision for aligning and mounting the IC chip is alleviated. The IC chip and the antenna circuit on the antenna sheet communicate with each other in a non-contact manner, which eliminates the necessity for a connection part that is vulnerable to external force therebetween and can greatly simplify the protection structure around the IC chip. Therefore, an IC chip can be mounted on a main surface of an antenna sheet with a simple oscillation sort or a dispenser, for example. As a result, inexpensive and fast manufacturing facility therefore can be implemented, and the structure itself of an RFID tag can be simple and therefore inexpensive to manufacture.

Typical structures of an RFID tag according to the invention are as follows:

Structure 1: An RFID tag including a tag sheet (or antenna sheet or base sheet) having an antenna pattern of a conductive material on a main surface and a circuit chip (or IC chip) on a main surface of the tag sheet, wherein the circuit chip is mounted on the main surface of the tag sheet so as to be electromagnetically connected to the antenna pattern, without directly connecting to the antenna pattern.

Structure 2: The RFID tag having Structure 1, wherein:

the circuit chip has a first main surface and a second main surface on the opposite side, the first main surface having an antenna extending in a loop shape along the peripheral edge; and the antenna pattern formed on the tag sheet is configured so as to concentrate an electromagnetic field generated thereby into the antenna of the circuit chip, and to radiate a signal output from the circuit chip through the antenna to the circumference of the RFID tag through the antenna pattern on the tag sheet.

Structure 3: The RFID tag having Structure 2, wherein:

on the main surface of the tag sheet, the antenna pattern has a detour part to detour around (or to circumvent) the circuit chip along its side that separates the first main surface and the second main surface of the circuit chip, and, at the detour part, the antenna pattern detects the electromagnetic field caused in the antenna of the circuit chip and captures a signal output from the circuit chip.

Structure 4: The RFID tag having Structure 3, wherein the detour part of the antenna pattern is formed in an area surrounding the side of the circuit chip on the main surface of the tag sheet by making at least half round of the circuit chip.

Structure 5: The RFID tag having Structure 4, wherein the detour distance of the detour part of the antenna pattern in the area on the tag sheet main surface is shorter than one round of the circuit chip.

Structure 6: The RFID tag having Structure 4, wherein the detour part of the antenna pattern exhibits a whorl making more than one round of the circuit chip in the area on the main surface of the tag sheet.

Structure 7: The RFID tag having Structure 6, wherein the antenna pattern has a first pattern having the whorl detour on the main surface of the tag sheet and extending from one end of the detour part, a second pattern extending from one end facing against the detour part through a gap and a connection sheet that is electrically connected to the one end of the first pattern and the one end of the second pattern; and the connection sheet intersects with but is electrically isolated from the other part of the detour part between the connection parts of the first pattern and the second pattern and forms a closed curve surrounding the circuit chip along with the detour part.

Structure 8: The RFID tag having Structure 3, wherein the antenna pattern forms a closed curve on the main surface of the tag sheet, and the detour part is included as a part of the closed curve.

Structure 9: The RFID tag having Structure 4, wherein the antenna pattern extends from one end of the detour part having a whorl making more than one round of the circuit chip in the area on the main surface of the tag sheet to the other end that faces against the detour part through a gap;

an antenna in a closed curve form is provided on the main surface of the tag sheet by electrically connecting between the one end and the other end through a connection sheet; and the connection sheet intersects with but is electrically isolated from the other part of the detour part between the connection parts of the one end and the other end and forms a closed curve surrounding the circuit chip along with the detour part.

Structure 10: The RFID tag having any one of Structures 1 to 9, wherein the circuit chip (or the main surface) has a disk shape or a substantially square shape; and, in the latter case, the corners of the circuit chip in the square shape are chamfered.

According to the invention, the necessity for contact connection between an antenna and an IC chip can be eliminated, and the precision for mounting and aligning the chip can be thus alleviated. Therefore, the manufacturing costs for an RFID tag can be greatly reduced.

BRIEF DESCRIPTION OF THE DRAWINGS

FIGS. 4A, 4B and 4C relate to the RFID tag according to the third embodiment of the invention.

FIGS. 7A and 7B relate to the fifth embodiment of the invention.

FIGS. 9A and 9B relate to the sixth embodiment.

DETAILED DESCRIPTION

With reference to drawings, embodiments of an RFID tag (which may be called Radio Frequency Identification tag or IC tag) according to the invention will be described.

First Embodiment

FIGS. 1A and 1B are typical external perspective views of an RF-ID circuit apparatus (or RFID tag) to which the invention is applied. FIG. 1A shows the entire RF-ID circuit apparatus, and FIG. 1B is a detail diagram of the surrounding of a circuit chip (such as an IC chip) 1. The circuit chip 1 has a whorl antenna coil 11 on a circuit surface of a disk-shaped silicon chip 10, which is a circuit substrate. The circuit chip 1 uses the antenna coil 11 to receive radio waves and power from the outside and return signal radio waves to the outside for communication with the outside (such as a reader, writer and the composite circuit, not shown). The antenna coil 11 implementing the information exchange between the circuit chip 1 and the external circuit may be coated with gold plating, for example, as an upper wire on the circuit surface side of the silicon chip 10 (that is, the base material of the circuit chip 1). A base film 20 having an antenna 21 of aluminum foil, for example, on a main surface to which the circuit chip 1 is to be mounted is called tag sheet (which is a base of the RFID tag). Though the circuit chip 1 is pasted near the antenna 21 on the main surface of the base film 20, it is not electrically connected to the antenna 21. The RFID tag shown in FIGS. 1A and 1B includes the antenna 21, the base film 20 and an adhesive layer 22 which is coated over the entire circuit chip 1 mounted on the base film 20.

The form of the antenna 21 on the main surface of the base film (which is a base) 20 of the RFID tag is changed according to the frequency for carrying information (or a signal) between the circuit chip 1 and an external circuit (which may be an external circuit of the RFID tag). The antenna 21 may be a dipole antenna for carrier waves at UHF band (from 300 to 3000 MHz) and may be a loop antenna for carrier waves at HF band (from 3 to 30 MHz). The antenna 21 shown in FIG. 1 extends in a rod form to both sides from the position where the circuit chip 1 is pasted to the main surface of the base film 20.

Figure 1:
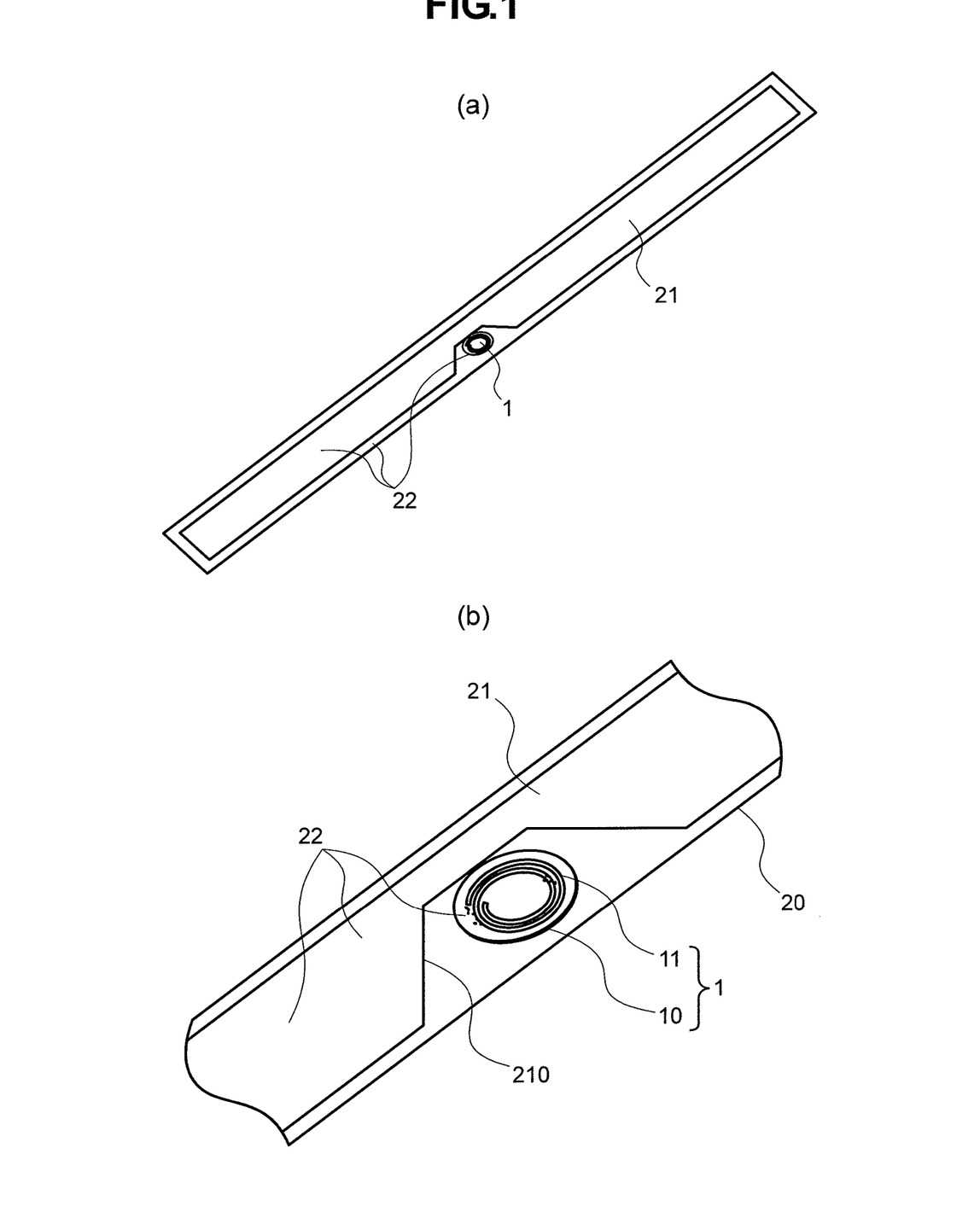
FIGS. 1A and 1B are perspective view of an RFID tag according to a first embodiment of the invention.
Figure 2:
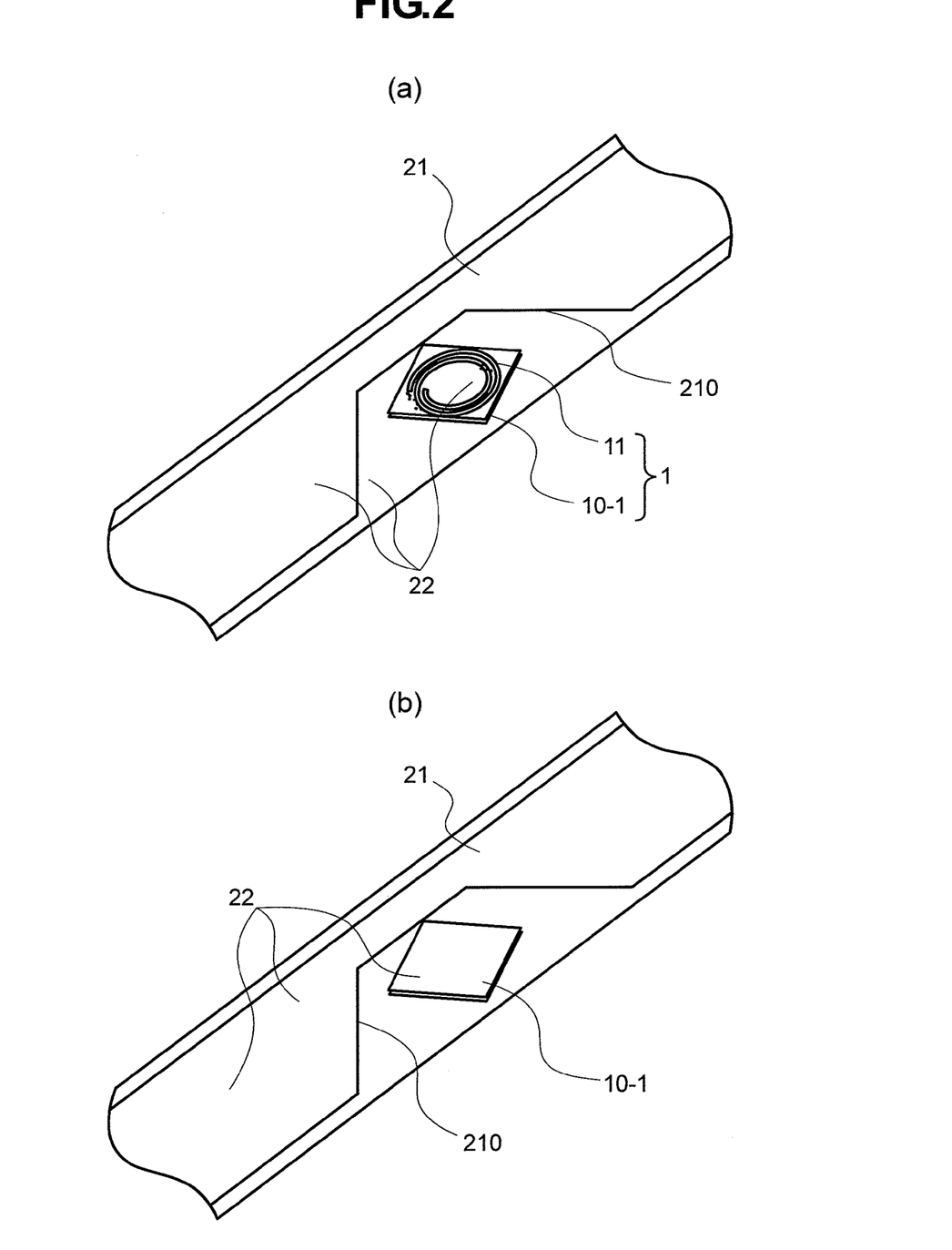
FIGS. 2A and 2B are perspective view of an RFID tag according to a second embodiment of the invention.

Though the antenna 21 extends in a rod (or rectangular) form, the antenna 21 has a notch 210 near the (expected) position of the circuit chip 1 on the main surface of the base film 20. The notch 210 allows the circuit chip 1 to land on the main surface of the base film 20, avoiding the top surface of the antenna 21. Therefore, even when the circuit chip 1 is mounted to the base film 20 with the main surface having the antenna 21 (which is a conductive film) faced against the main surface of the base film 20 (so called upside down), the circuit in the circuit chip 1 does not establish a short circuit due to the contact between the antenna coil 11 and the antenna 21. At the same time, since the antenna 21 decreases in wire width near the circuit chip 1, antenna current can be fed to the vicinity of the chip. Since the form of the notch 210 of the antenna 21 is a simple trapezoid, the precision for molding the antenna 21 can be greatly alleviated.

The material of the base film 20 may be a resin film which is inexpensive and high availability, such as a PET (which stands for Polyethylene Terephthalate) film and an OPP (which stands for biaxially Oriented Polypropylene) film, but a sheet of paper which can be easily pasted to (or which is compatible with) an RFID tag to be pasted to a paper slip is usable as the base film 20. Aluminum foil is inexpensive and has high availability as a material of the antenna 21 suitable for the base film 20 of a resin, but additional processing such as etching for forming the antenna 21 is required. For that reason, a conductive silver paste may be printed on the main surface of the base film 20 to form the circuit pattern of the antenna 21.

Here, the circuit chip 1 has a substantially disk shape and has no corners, which are easily chipped, unlike in a conventional square semiconductor circuit chip, which is cut out by dicing, for example, from a silicon wafer (which is a semiconductor monocrystalline (single-crystalline) base material). Therefore, there is a less possibility for breaking or chipping the circuit chip 1 (especially the semiconductor substrate 10 of a silicon chip, for example) even under the application of external force. Since the circuit chip 1 and the antenna 21 are not connected as an electric circuit, there are no connection parts, which are formed by crimping or butt-welding and are sensitive to humidity to such an extent that it generally requires moisture-resistant protection, between them. Therefore, the circuit on the main surface of the base film 20 including the circuit chip 1 and the antenna 21 does not require rigid protection unlike a conventional RFID tag or a wireless card, and practically sufficient reliability can be obtained only by providing the circuit between the base film 20 and the adhesive layer 22. Since the adhesive layer 22 is only required to have a certain degree of electrical insulation, it may be formed by a rubber-based adhesive or an acrylic adhesive.

Since the circuit chip 1 and the antenna 21 (or tag sheet) are connected without forming an electric circuit, the precision for mutual alignment, which is required for processes for mounting and connecting the circuit chip 1 to the antenna 21, can be greatly alleviated, compared with external circuit connection methods such as wire bonding and flip chip bonding by using a bump interconnection between them.

Since a signal is transmitted between the circuit chip 1 and the antenna 21 independent of the main surface of the circuit chip 1 (that is, independent of the front and back of the circuit chip 1) facing against the main surface (which is the surface having the antenna 21) of the base film 20, RFID tags can be volume-produced without adjusting the orientation of the circuit chip 1 for each base film 20 (or RFID tag). In other words, the necessity for aligning the circuit chips in one orientation about the base 20 is eliminated, which further eliminates the necessity for alignment of multiple circuit chips 1 to be respectively placed on the multiple base film 20. When the antenna 21 shown in FIGS. 1A and 1B is rendered on the main surface of the base film 20 by a conductive paste (such as a conductive material of silver (Ag) (or metal or an alloy) and a solvent in which conductive high polymer precursors are distributed), the circuit chips 1 may be distributed to liquid having liquid repellency against the solvent (or "thin film" formed by hardening, and the liquid (in several drops including the circuit chip 1) may be dropped to the main surface of the base film 20. Then, the circuit chip 1 lands on the main surface of the base film 20 by avoiding the top surface of the antenna 21. Particularly, the notch 210 (or a trapezoidal part exposing the main surface of the base film 20) of the antenna 21 easy gets wet by the liquid drops. Therefore, the circuit chip 1 can be easily fixed to the inside of the notch 210.

With reference to FIGS. 2A to 12, other embodiments of the invention

Second Embodiment

FIGS. 2A and 2B show a similar antenna structure to that of the first embodiment described with reference to FIGS. 1A and 1B except that the circuit chip 1 includes a square-shaped circuit substrate 10-1. According to this embodiment, the antenna coil 11 and the antenna 21 are only placed closely, but connection by the mutual contact is not required. Therefore, the limitations on the mounting position, angle and front or back of the circuit chip 1 on the main surface of the base film 20 can be alleviated. For example, as shown in FIG. 2B, even when the circuit substrate 10-1 is mounted on the main surface of the base film 20 upside down, no problems occur like the first embodiment. Since the circuit chip 1 can be cut out by cutting a semiconductor base material such as a silicon wafer straight with a dicing blade for use in a general semiconductor post-process, the square-shaped circuit substrate 10-1 (or the circuit chip 1) can be obtained at low costs and from one silicon wafer with high area efficiency.

Third Embodiment

Figure 3:
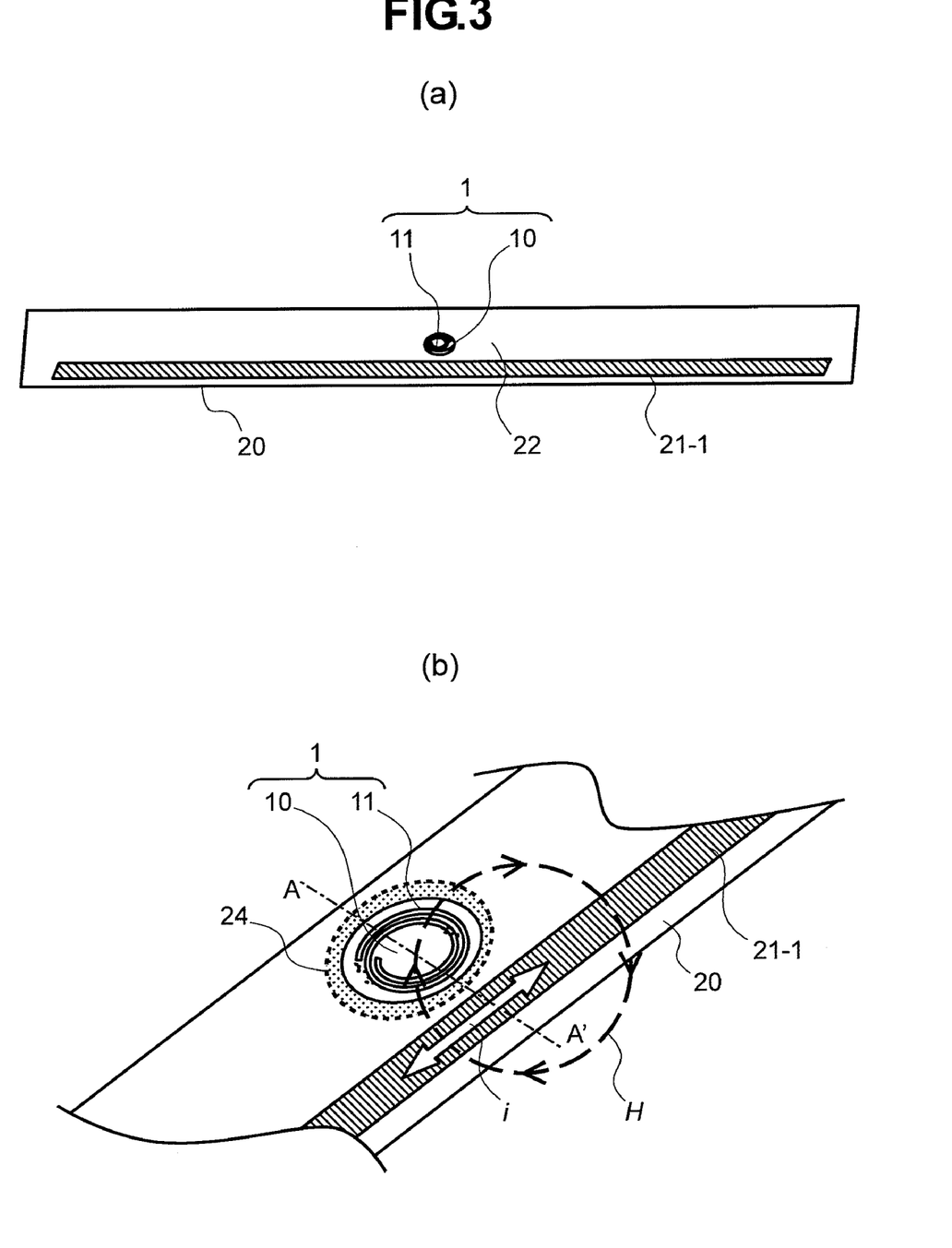
FIGS. 3A and 3B are a plan view of an RFID tag and an enlarged perspective view of the main part according to a third embodiment of the invention.

The RFID tag according to this embodiment, which will be described with reference to FIGS. 3A and 3B, is characterized by an antenna 21-1 which is formed in a straight line on the main surface of the base film 20. The dipole antenna 21-1 does not have a so-called notch at the center (or near the longitudinal middle point), unlike the antenna 21 according to the first and second embodiment. Also in this embodiment, the circuit chip 1 is only required to place near the center of the antenna 21-1, and the precision for aligning the chip can be more alleviated than that in the antenna 21 case. However, the communication condition between the circuit chip 1 and the antenna 21-1 depends on the attitude of an antenna coil 11 of the circuit chip 1 about a magnetic field H, which is induced by current i occurring in the dipole antenna 21-1, as shown in FIG. 3B. For example, when the circuit chip 1 is fixed to the main surface of the base film 20 at one side (or side wall), the strength of the magnetic field H within the antenna coil 11 decreases, and information obtained by the antenna 21-1 from the outside of the RFID tag is not sufficiently input to the circuit chip 1.

In order to avoid the problem, a mounting position (which is the area within a broken-line circle) 24 for the circuit chip 1 on the main surface of the base film 20 shown in FIG. 3B has a specific pattern. The pattern is formed by processing the main surface of the base film 20 to increase the affinity for (compatibility with) a disperse medium (which will be described later by using a reference numeral 25) for supplying the circuit chip 1 to the main surface of the base film 20 more than that in the area excluding the mounting position 24 (which is an area outside of the broken-line circle and including the top surface of the antenna 21-1). The pattern may also be formed by processing on the area such that the entire area (including the top surface of the antenna 21-1) excluding the mounting position 24 on the main surface of the base film 20 can exhibit liquid repellency against the disperse medium.

Figure 4:
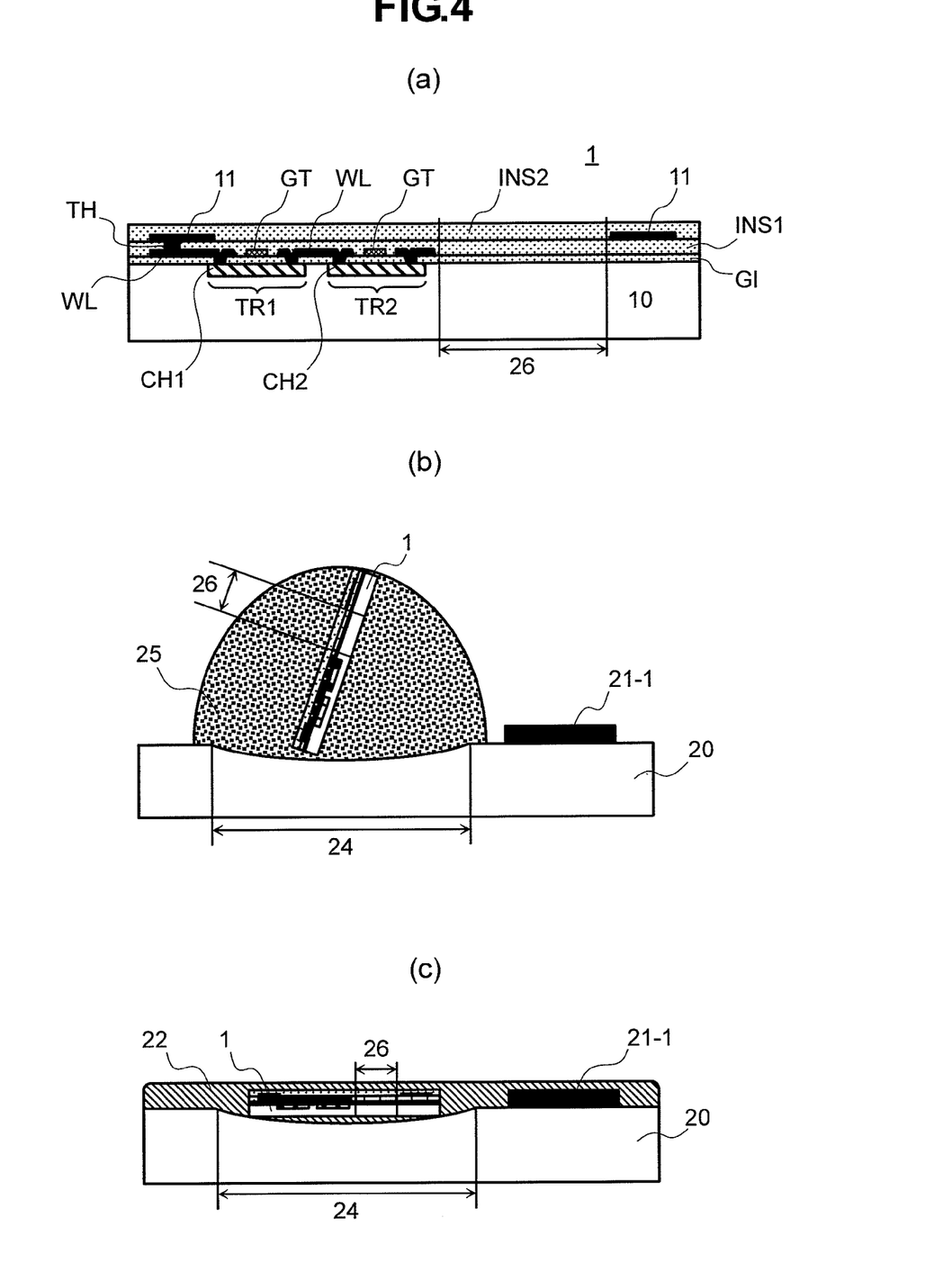
FIG. 4A is a schematic section view of a circuit chip to be mounted thereon.
FIGS. 4B and 4C are explanatory diagrams illustrating the step of mounting the circuit chip to a main surface of a base film (or tag sheet)

Referring to FIGS. 4A to 4C, the specific pattern according to this embodiment will be described which is formed by denting the mounting position 24 for the circuit chip 1 on the main surface of the base film 20 by pressing, for example. FIG. 4A shows a section of the circuit chip 1 suitable for mounting an RFID tag according to the invention. FIG. 4B shows a state that the circuit chip 1 is supplied to the specific pattern on the mounting position 24 on the main surface of the base film 20. FIG. 4C shows a section of an RFID tag (completed) in which the circuit chip 1 is fixed to the mounting position 24, which is a section view taken on the line A-A' in FIG. 3B.

The circuit chip 1 shown in FIG. 4A has multiple active elements on one main surface of the silicon chip (which is a semiconductor base) 10. The active elements may be included in a circuit pattern for, for example, an interface circuit that is responsible for exchange of signals with a memory circuit (such as a transistor array) or an external circuit of the circuit chip 1 within the main surface of the silicon chip 10. However, according to this embodiment (in FIG. 4A), the circuit pattern includes a pair of field-effect transistors TR1 and TR2. The field-effect transistors TR1 and TR2 include active regions (or channels) CH1 and CH2, which are reformed by the application of an n-type or p-type impurity to the vicinity of the main surface of a monocrystalline substrate (such as a silicon chip 1) of an intrinsic semiconductor, an insulating film (or gate insulating film) GI covering the main surface of the silicon chip 10 including the active regions, a wiring layer (or gate electrode) GT, which is provided on the insulating film GI and applies an electric field to the active regions through the insulating film GI, and a wiring layer WL, which is formed on the insulating film GI and electrically connects to the active regions through an opening of the insulating film GI. Even when the field-effect transistors are replaced by bipolar transistors or diodes, the equivalents for the active regions and wiring layers are formed in a suitable form within the silicon chip 10 or on the main surface. The insulating film GI and insulating films INS1 and INS2 covering the wiring layers GT and WL protect the structures such as the wiring layers GT and WL on the main surface of the silicon chip 10 from an atmosphere of the circuit chip and prevent the establishment of an unexpected electric short circuit with an external circuit around the circuit chip. The main surface (or the top surface) of the silicon chip 10 having the active elements such as the field-effect transistors TR1 and TR2 and the wiring layers GT and WL are also called "circuit surface".

The antenna coil 11 of the circuit chip 1 for use in communication with the antenna 21-1 is provided between the insulating film ISN1 and the insulating film INS2 and is electrically connected to the circuit pattern (wiring layer WL) through a through-hole TH of the insulating film INS1. The antenna coil 11 is covered by the insulating film INS2 and is electrically isolated from the antenna 21-1 on the main surface of the base film 20 and a conductive material present around the RFID tag.

The circuit chip 1 shown in FIG. 4A is also characterized by "circuit-pattern unformed part 26" within an area surrounded by the antenna coil 11 on the main surface (such as the circuit surface). The area 26 will be called communication surface for convenience. Since the communication surface 26 does not have the active elements and wiring layers, the magnetic field H caused by the antenna 21-1 passes through the surface, without being blocked by the conductive layer. Therefore, the exchange of signals between the circuit chip 1 and the antenna 21-1 can be implemented with high sensitivity.

The mounting of the circuit chip 1 to the main surface of the base film 20 shown in FIGS. 4B and 4C is applicable to the implementation to the base film 20 of various circuit chips (or IC chips) to be mounted to the RFID tag, not limiting to the circuit chip 1 shown in FIG. 4A. However, according to this embodiment, in order to clearly grasp the relationship between the attitudes of the circuit chip 1 about the base film 20 and the corresponding reception sensitivities in the communication between the circuit chip 1 and the antenna 21-1, the mounting process will be described with reference to the circuit chip 1 shown in FIG. 4A.

FIG. 4B shows a state that the circuit chip 1 along with the disperse medium 25 is dropped to the main surface of the base film 20. The shown base film 20 has a form that is cut out for each RFID tag from a base material, but the circuit chip 1 may be supplied closely to each of the multiple antennas 21-1 on the main surface of the base material. The supply of the circuit chip 1 includes discharging a predetermined amount of the disperse medium 25 in which multiple circuit chips 1 are distributed from a dispenser, a syringe or an inkjet nozzle, for example, to the vicinity of the antenna 21-1 formed for each RFID tag. The circuit chip 1 is fed to the main surface of the base film 20 about one in one drop of the disperse medium 25. If multiple circuit chips 1 are supplied to the mounting position 24 (or the specific pattern formed there), those excluding the circuit chip 1 having the largest area facing against the mounting position 24 through the disperse medium 25 may be removed from the main surface of the base film 20 with a blower, for example. If the drop of the disperse medium 26 shown in FIG. 4B wets and spreads over the main surface of the base film 20, the circuit chip 1 is placed over the antenna 21-1 or is fixed to the base film 20 with one end leaning on the antenna 21-1. For that reason, the magnetic field H induced in the antenna 21-1 may not enter to the communication surface 26 easily or can enter to the communication surface 26 but is returned to the inputting side without passing therethrough.

However, the concave at the mounting position 24 of the base film 20 is shallow but can suppress the wet spread of the disperse medium 25 on the main surface of the base film 20. In particular, if the disperse medium 25 exhibits a large contact angle against the surface excluding the mounting position 24 of the base film 20, the drop of the disperse medium 25 stays at the "specific pattern" on the mounting position 24 and is vaporized. Thus, the circuit chip 1 takes an attitude with one of the main surfaces directing the mounting position 24 (or the main surface of the base film 20). As a result, the communication surface 26 intersects with the magnetic field H induced in the antenna 21-1 at an approximately right angle, which increases the density of the magnetic flux passing through between the main surfaces of the circuit chip 1. By, under the state, coating an adhesive material to the entire main surface of the base film 20 and drying it, the adhesive layer 22 is formed on the main surface of the base film 20 as shown in FIG. 4C. Since the adhesive layer 22 is so-called half-dried and is not hardened completely, it can be lightly pressed against a subject (such as a parcel and a book) to be managed with the RFID tag to paste the base film 20 (having the antenna 21-1 and having the circuit chip 1 fixed) to the subject.

Desirably, the area of the specific pattern at the mounting position 24 is larger than the area of the main surface (or a wider main surface if both sides have different areas) of the circuit chip 1 including not only the case where the specific pattern is formed as a concave of the main surface of the base film 20 as described above but also a case where the specific pattern is formed as a surface-reformed area exhibiting the affinity for (compatibility with) the disperse medium 25, for example. In other words, as the area of the specific pattern increases, the restraint thereby on the disperse medium 25 increases. As a result, the attitude of the circuit chip 1 about the antenna 21-1 can be kept more preferably. By extending the outer edge of the specific pattern so as to surround the main surface (or wider main surface if both sides have different areas) of the circuit chip 1, the angle formed by the main surface of the circuit chip 1 and the main surface of the base film 20 approaches "0 (zero)", and the density of the magnetic flux through the circuit chip 1 (especially, the communication surface 26) can be increased.

On the other hand, as shown in FIG. 4C, the adhesive layer 22 is desirably formed on the main surface of the base film 20 such that the top surface levels off the ups and downs caused by the formation of the antenna 21-1 and the mounting of the circuit chip 1. The precursor (which is an adhesive) of the adhesive layer 22 is preferably a material with high adhesion or high surface tension.

The forms of the "specific pattern" and the adhesive layer 22 on the main surface of the base film 20 according to this embodiment are also applicable to the RFID tags according to the first and second embodiments and the RFID tags according to the fourth and subsequent embodiments.

Fourth Embodiment

The circuit chip 1 according to this embodiment has a substantially circular main surface which does not cause even chipping easily, but the intended effect of chipping prevention can be obtained only by the improvement of the layout of the main surface of the base film 20 to which the circuit chip 1 is to be mounted (the flat form of the antenna 21 or the rate of coating on the main surface). For that reason, it is apparent that the disk-shaped circuit chip 1, which will be described later, may be replaced by a square-shaped circuit chip 1 as shown in FIGS. 2A and 2B or by a substantially square-shaped circuit chip (or silicon chip 10) resulting from the chamfering on the corners, which will be described with reference to FIG. 10.

Figure 5:
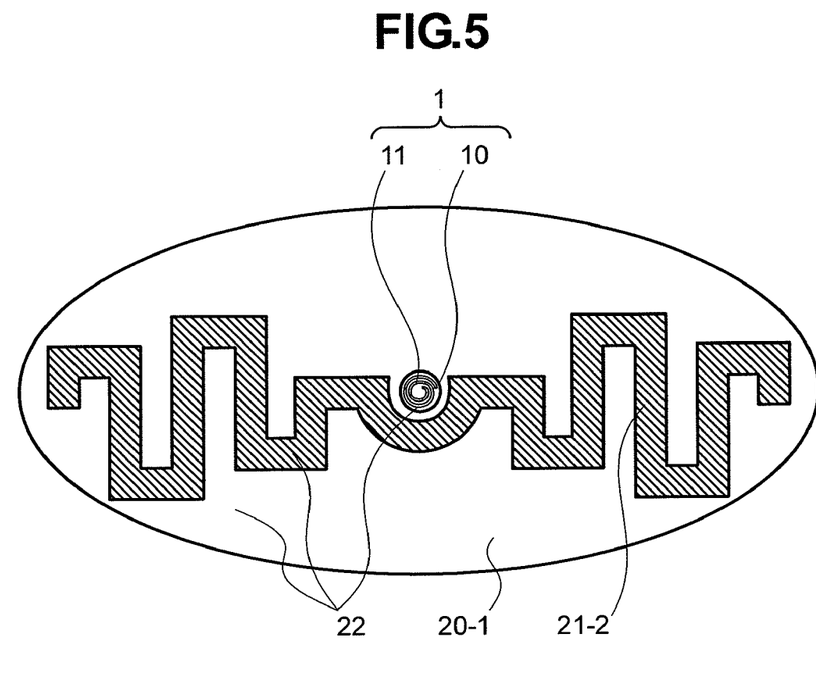
FIG. 5 is a plan view of an RFID tag according to a fourth embodiment of the invention.

The RFID tag according to this embodiment shown in FIG. 5 is characterized in that both sides of an antenna 21-2 (about the mounting position of the circuit chip 1) on the oval main surface of the base film 20-1 exhibit a fanfold form. Thus, the longitudinal dimension (that is, "total length") of the base film 20-1 is shorter than those of the RFID tags according to the first to third embodiments, and an RFID tag that can be pasted to a subject even in a small area can be implemented. The antenna 21-2 forms a detour making about ½ round of the vicinity of the circuit chip 1, and the circuit chip 1 is placed inside of the detour (facing toward the inner circumference). In other words, since the half or more of the outer edge (or side wall) of the circuit chip 1 faces against the antenna 21-2 through a gap, an extremely weak signal oscillated from the antenna coil 11 (or the circuit chip 1) can be detected by the antenna 21-2 efficiently and is read out to a so-called outer circuit of the RFID tag. Therefore, even when the antenna length from the circuit chip 1 to the end of the antenna 21-2 is reduced, the characteristic loss due to the reduction can be compensated by the form of the antenna 21-2.

Figure 10:
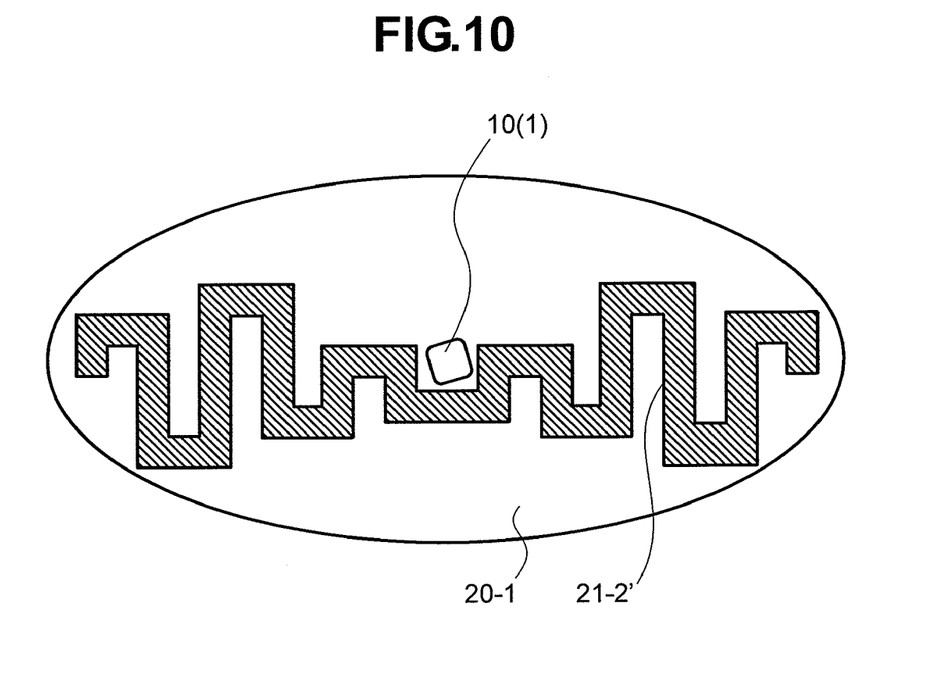
FIG. 10 is a plan view of an RFID tag according to the invention, which has a circuit chip in a schematic square shape resulting from chamfering of the corners of the rectangular main surface.

The detour has an arc-shape (or U-shape) according to this embodiment, but a part of the detour may have a rectangular (or square) shape as shown in FIG. 10 in order to alleviate the required precision for the dimension of the antenna 21-2. In the antenna 21-2 involved in the communication with an outside circuit of the RFID tag, the detour significantly contributes to the exchange of a signal input/output to/from the circuit chip 1. Therefore, the detour may be also called "signal transfer part" independent of the form of the antenna.

Since the RFID tag according to this embodiment does not exhibit a long and narrow form, unlike the base film 20 of the RFID tags according to the first to third embodiments, the RFID tag pasted to a managed subject (such as a parcel) through the adhesive layer 22 in actual use does not easily peel off from the managed subject.

Fifth Embodiment

As the length of the extension of the detour (or signal transfer part) of the antenna 21-2 according to the fourth embodiment along the outer circumference (or side wall) of the circuit chip 1 increases, the precision for communication increases between the antenna 21-2 and the circuit chip 1. According to this embodiment, the form of an antenna having a detour making more than ½ round of the outer circumference of the circuit chip 1 will be described with reference to FIG. 6 and FIGS. 7A and 7B.

Figure 6:
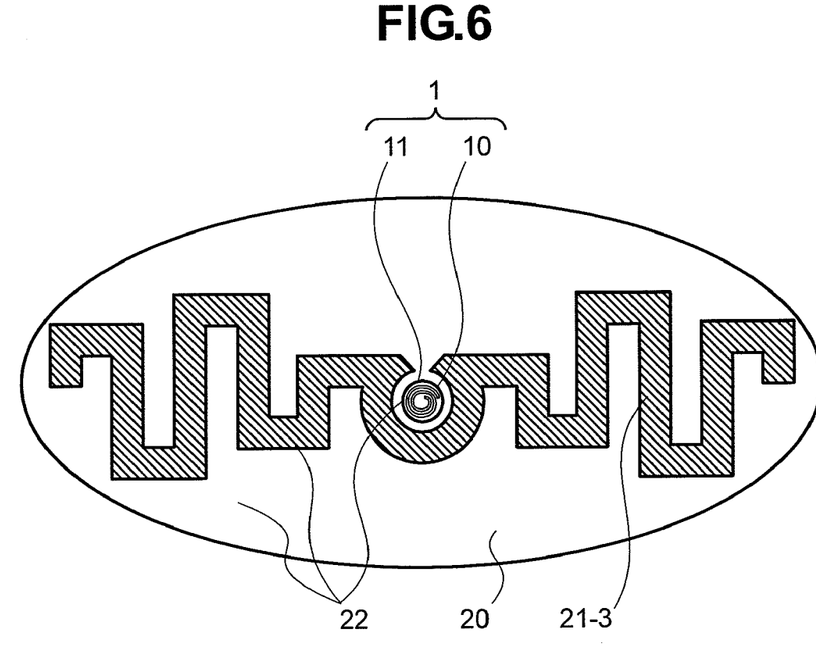
FIG. 6 is a plan view of an RFID tag according to a fifth embodiment of the invention.

An antenna 21-3 of the RFID tag shown in FIG. 6 has a detour extending approximately more than ½ to nearly one round of the outer circumference (or outer edge) of the circuit chip 1 as much as possible. The detour does not surround the circuit chip 1 completely, and both ends face against each other through a gap around the circuit chip 1. Therefore, the detour surrounds the circuit chip 1 about ¾ round and is "open" in the remaining 1/4 round. Even the detour of the antenna 21-3, which does not render a closed curve for enclosing the circuit chip 1, can allow easy concentration of electric fields to the vicinity of the circuit chip 1, which can further improve the efficiency of the signal exchange between the antenna 21-3 and the circuit chip 1.

Figure 7:
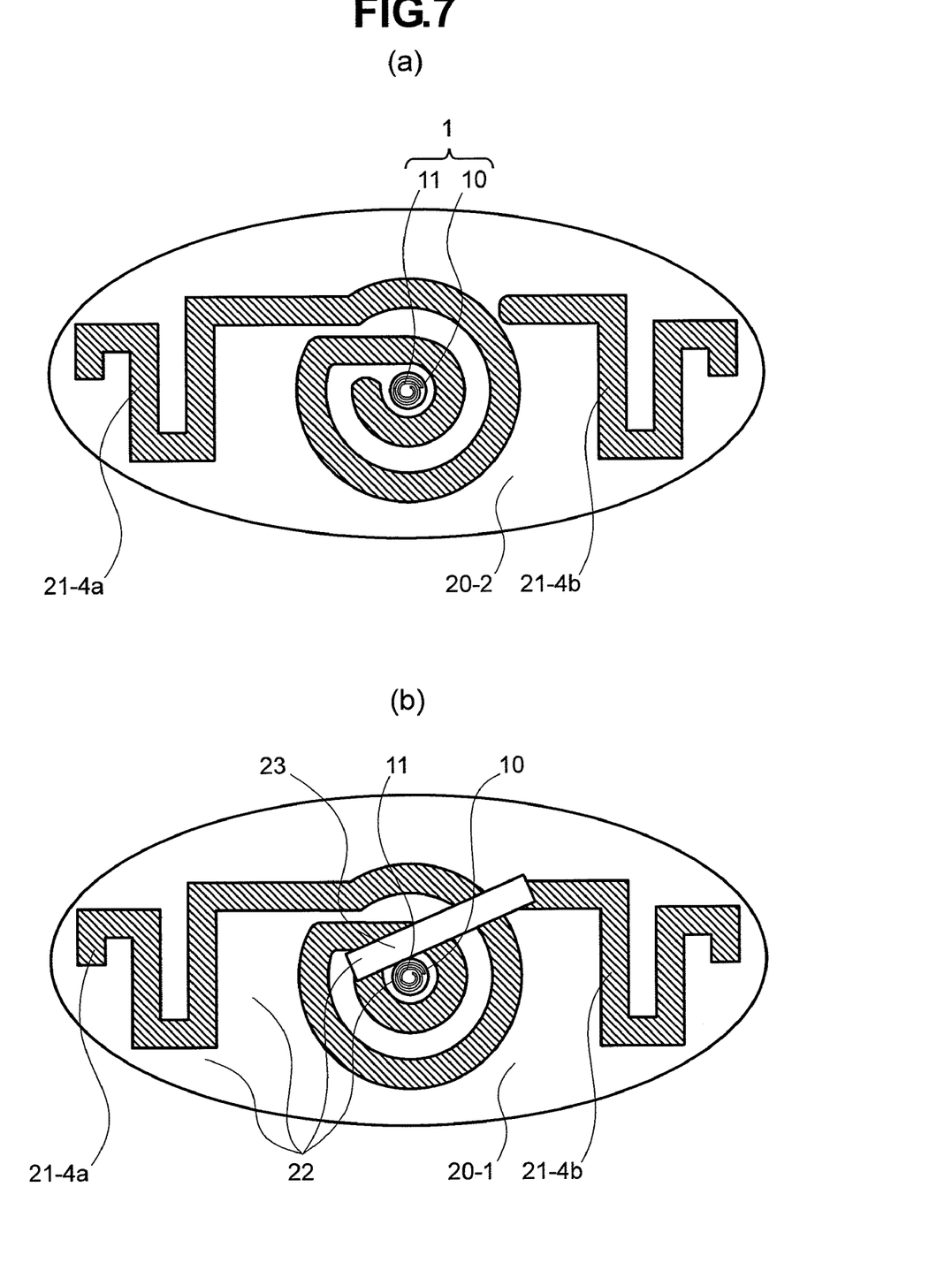
FIG. 7A shows a plan view illustrating an antenna pattern on the main surface of the base film.
FIG. 7B shows a plan view illustrating an RFID tag completed by fixing a connection sheet to the antenna pattern.

FIG. 7A shows an RFID tag including an antenna 21-4a forming a detour making more than one round, that is, multiple rounds of the circuit chip 1. The part surrounding the circuit chip 1 of the antenna 21 has a "whorl" necessarily when the number of rounds is more than one. For that reason, the antenna 21-4a is extended to both sides of the detour, and a dipole antenna cannot be formed that exchanges signals with an external circuit at a carrier frequency in UHF band. In order to solve the technical problem, there is provided, according to this embodiment, an RFID tag which has the antenna 21-4a having a detour and an antenna 21-4b spaced from the antenna 21-4a on the main surface of the base film 20-1 as shown in FIG. 7B. The antenna 21-4a and the antenna 21-4b are electrically connected by a connection sheet 23 before the adhesive layer 22 to cover them is coated over the main surface of the base film 20-1. In other words, a dipole antenna extends from one end of the antenna 21-4a to one end of the antenna 21-4b by bringing one end of the antenna 21-4a and the other end of the antenna 21-4b into conduction through the connection sheet 23. The connection sheet 23 contains a conductive member (such as a metallic foil) as a base material, but the back, not shown, excluding both ends (or the parts connecting to the ends of the antennas 21-4a and 21-4b) is coated with an insulating coating. Thus, the connection sheet 23 does not electrically establish a short circuit with the whorl detour of the antenna 21-4 even by crossing it. Since the connection sheet 23 is covered by the adhesive layer 22 along with the antennas 21-4a and 21-4b, circuit chip 1 and main surface of the base film 20-1, the connection state between the connection sheet 23 and one end of each of the antennas 21-4a and 21-4b can be kept in a stable manner.

In the RFID tag shown in FIGS. 7A and 7B, the antenna 21 makes multiple rounds of the outside of the circuit chip 1, that is, the antenna coil 11. Therefore, the antenna 21 (or tag sheet) and the antenna coil 11 can be more easily connected when signals at a lower carrier frequency such as HF band are exchanged between the antenna 21 and the circuit chip 1.

Sixth Embodiment

Having described the RFID tags including a dipole antenna which is suitable for exchanging signals with an external circuit at a higher carrier frequency such as UHF band according to the first to fifth embodiments, an RFID tag including a loop antenna or a spiral antenna instead of the dipole antenna which is suitable for exchanging signals with an external circuit at a lower carrier frequency such as HF band will be described according to this embodiment.

In the RFID tag shown in FIG. 8, the antenna 21 of the RFID tag according to the fourth embodiment, which has been described with reference to FIG. 5, is replaced by a loop circuit (which will be called loop antenna 21-5) making one round of the circuit chip 1. The RFID tag has an advantage that the limited main surface (effective area) of an oval base film 20-1 can be used as an effective area of the antenna as much as possible. Particularly, the influence by the communication position (in the layout of the RFID tag and the external circuit) in the communication with a hand-held reader antenna (which is an external circuit) can be reduced.

The RFID tag shown in FIGS. 9A and 9B includes a loop-shaped antenna 21-6 instead of the antenna 21-4*a* of the RFID tag according to the fifth embodiment, which has been described with reference to FIGS. 7A and 7B. The antenna 21-6 extends in a loop shape from one end of a whorl detour to the other end facing against the detour through a gap, and the one end and the other end are connected through the connection sheet 23 as described according to the fifth embodiment to form a closed curve. The connection sheet 23 intersects with the part having the detour of the antenna 21-6 between one end and the other end of the antenna 21-6 but does not electrically establish a short circuit with the intersection because of the insulating processing at the back, not shown. Furthermore, since the connection sheet 23 is covered by the adhesive layer 22 along with the antenna 21-6, circuit chip 1 and the main surface of the base film 20-1, the connection state between the connection sheet 23 and both ends of the antenna 21-6 can be kept in a stable manner.

Figure 8:
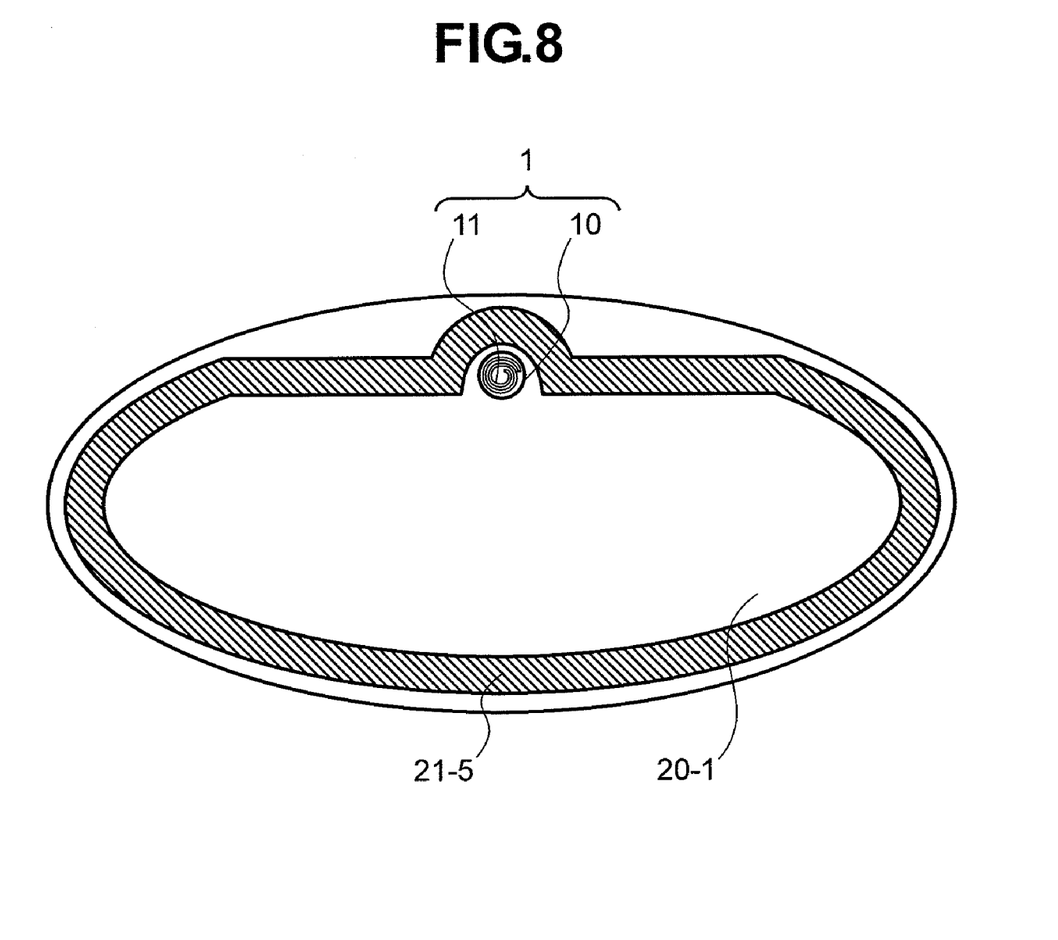
FIG. 8 is a plan view of the RFID tag according to a sixth embodiment of the invention.
Figure 9:
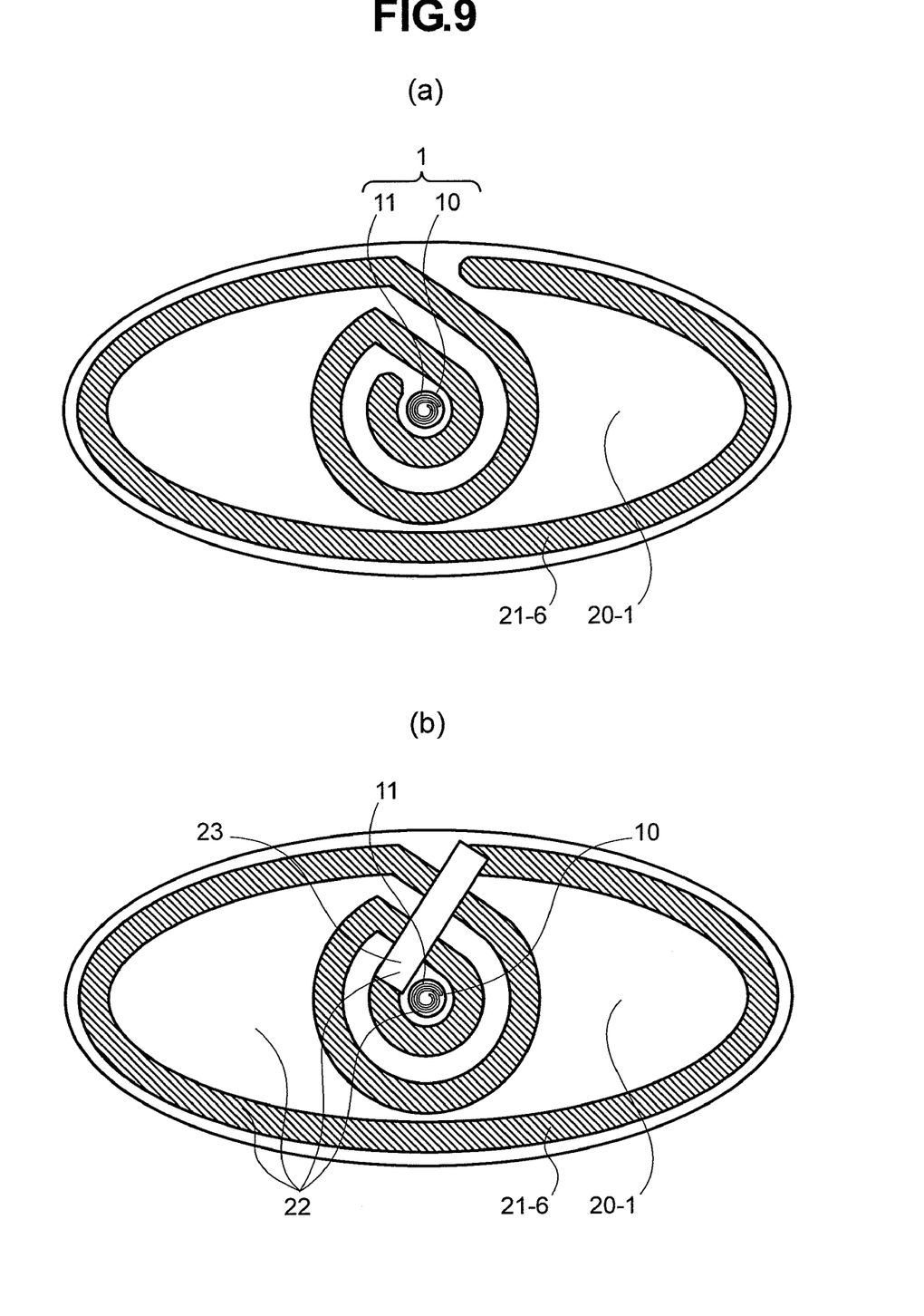
FIG. 9A shows a plan view illustrating an antenna pattern on the main surface of a base film.
FIG. 9B shows a plan view illustrating an RFID tag completed by fixing a connection sheet to the antenna pattern.

In other words, the RFID tag shown in FIGS. 9A and 9B has the advantages of the RFID tags shown in FIGS. 7A and 7B and 8, and good communication performance can thus be obtained.

Seventh Embodiment

According to this embodiment, application examples of the RFID tags according to the first to sixth embodiments will be described.

Figure 11:
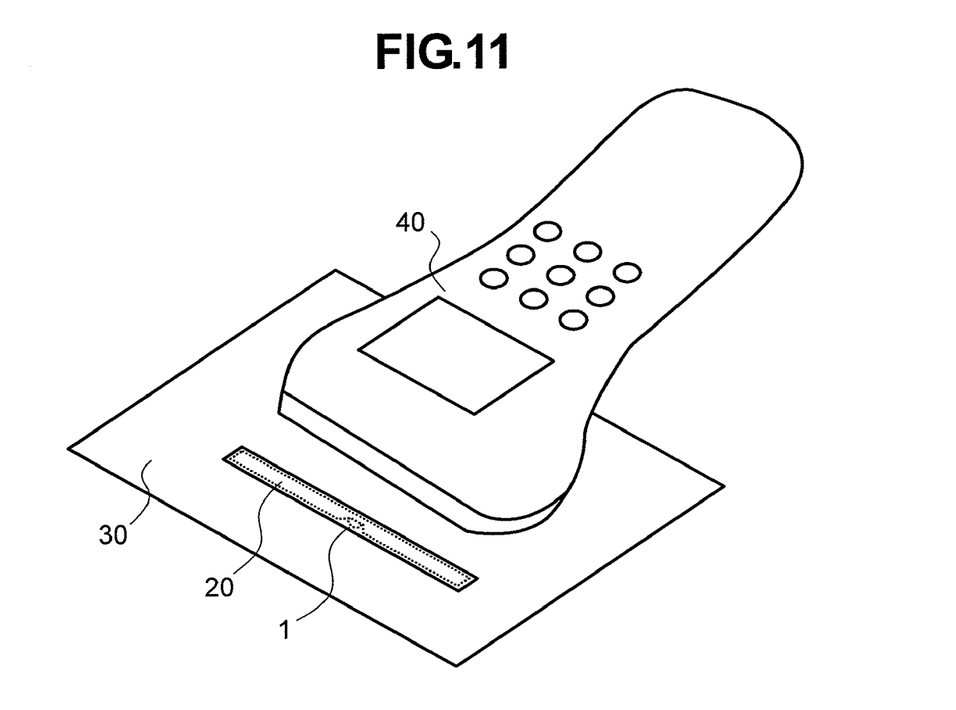
FIG. 11 relates to a seventh embodiment of the invention and is an explanatory diagram showing an application of an RFID card including the RFID tag according to the first embodiment.

FIG. 11 shows an application example of an RFID card employing the RFID tag according to the first embodiment of the invention. The RFID tag is pasted to an ID card 30 through the adhesive layer 22 at the back, not shown, and the circuit chip 1 is covered by the base film 20 and is not exposed. In other words, the circuit chip 1 is sandwiched between the base film 20 (or the main surface) and the ID card 30 along with the antenna on the main surface of the base film 20.

When a handheld reader 40 is brought closely to the base film 20 (or the back without the circuit chip 1 and so on), signal exchange is performed by the RFID tag so that the ID card can be authenticated. According to this embodiment, since the antenna 21, not shown, has a long and narrow form, high precision for positioning is not required in the longitudinal direction of the antenna 21 in particular even when a pad-shaped antenna having a narrow reception area is used as the internal antenna of the handheld reader. Therefore, manual alignment can be performed thereon easily.

Figure 12:
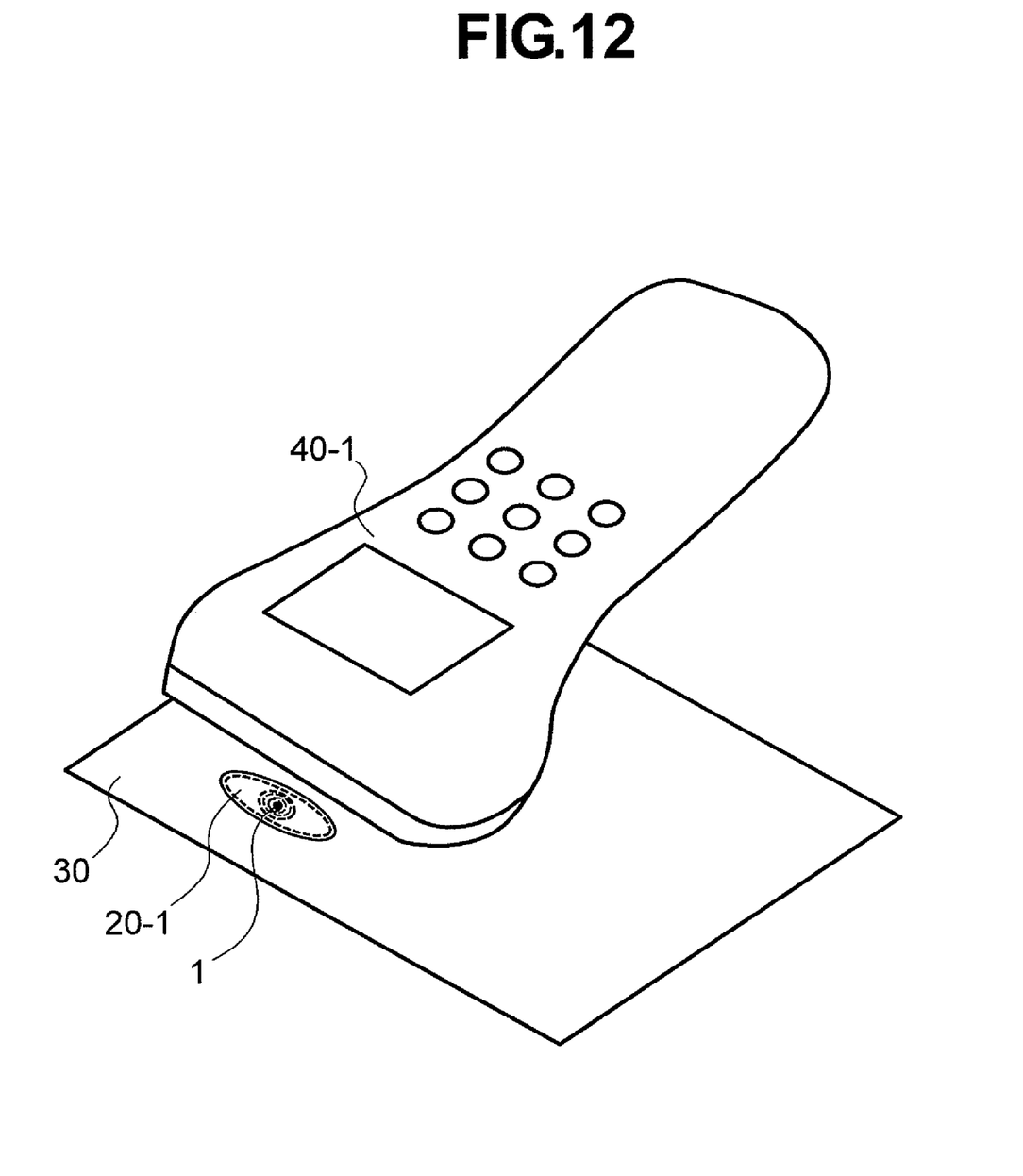
FIG. 12 relates to the seventh embodiment of the invention and is an explanatory diagram showing an application of an RFID card having the RFID tag according to the sixth embodiment.

FIG. 12 shows another application example of the RFID card having an RFID tag according to the sixth embodiment of the invention, which has been described with reference to FIGS. 9A and 9B.

In this case, a base film 20-1 has an oval shape in a small area, which requires higher precision for alignment than those in the embodiments above. Accordingly, as a reader for reading the RFID tag in the form, the use of a handheld reader 40-1 internally including a dipole antenna having a wider reception area is preferable. Thus, even a small RFID tag having an inconspicuous appearance can be easily aligned to use.

Since the RFID tag according to the invention can be manufactured without electrically connecting a circuit chip to an antenna having a tag sheet, the failure due to the misalignment of the circuit chip and the tag sheet can be removed. Thus, even giving an impact to the RFID tag does not easily cause any failure in communication between the circuit chip and an external circuit of the RFID tag. As a result, an RFID tag directly pasted to an object which is exposed to external force (such as a cloth to be washed and a vegetable having a hard outer layer of the skin like a pumpkin) allows the secure tracking of the movement of the object, without providing any protective material to the RFID tag.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. An RFID tag comprising a tag sheet including an antenna pattern comprised of a conductive material on a main surface and a circuit chip on a main surface of the tag sheet,
    wherein the circuit chip is mounted on the main surface of the tag sheet so as to be electromagnetically connected to the antenna pattern, without directly connecting to the antenna pattern, and
    wherein the antenna pattern is comprised of a bar antenna which has ends at both sides, and the circuit chip is electromagnetically connected substantially at the middle of the bar antenna.

2. The RFID tag according to claim 1, wherein:
    the circuit chip has a first main surface and a second main surface on the opposite side, the first main surface having an antenna extending in a loop shape along the peripheral edge; and
    the antenna pattern formed on the tag sheet is configured so as to concentrate an electromagnetic field generated thereby into the antenna of the circuit chip and to radiate a signal output from the circuit chip through the antenna to the circumference of the RFID tag through the antenna pattern on the tag sheet.

3. The RFID tag according to claim 2, wherein:
    on the main surface of the tag sheet, the antenna pattern has a detour part to detour around the circuit chip along a side thereof that separates the first main surface and the second main surface thereof, and, at the detour part, the antenna pattern detects the electromagnetic field caused in the antenna of the circuit chip and captures a signal output from the circuit chip.

4. The RFID tag according to claim 3, wherein the detour part of the antenna pattern is formed in an area surrounding the side of the circuit chip on the main surface of the tag sheet by making at least half round of the circuit chip.

5. The RFID tag according to claim 4, wherein the detour distance of the detour part of the antenna pattern in the area on the tag sheet main surface is shorter than one round of the circuit chip.

6. The RFID tag according to claim 4, wherein the detour part of the antenna pattern exhibits a whorl making more than one round of the circuit chip in the area on the main surface of the tag sheet.

7. The RFID tag according to claim 6, wherein the antenna pattern has a first pattern having the whorl detour on the main surface of the tag sheet and extending from one end of the detour part, a second pattern extending from one end facing against the detour part through a gap and a connection sheet that is electrically connected to the one end of the first pattern and the one end of the second pattern; and the connection sheet intersects with but is electrically isolated from the other part of the detour part between the connection parts of the first pattern and the second pattern and forms a closed curve surrounding the circuit chip along with the detour part.

8. The RFID tag according to claim 3, wherein the antenna pattern forms a closed curve on the main surface of the tag sheet, and the detour part is included as a part of the closed curve.

9. The RFID tag according to claim 4, wherein the antenna pattern extends from one end of the detour part having a whorl making more than one round of the circuit chip in the area on the main surface of the tag sheet to the other end that faces against the detour part through a gap;

an antenna in a closed curve form is provided on the main surface of the tag sheet by electrically connecting between the one end and the other end through a connection sheet; and the connection sheet intersects with but is electrically isolated from the other part of the detour part between the connection parts of the one end and the other end and forms a closed curve surrounding the circuit chip along with the detour part.

10. The RFID tag according to any one of claims 1 to 9, wherein the circuit chip has a disk shape.

11. The RFID tag according to any one of claims 1 to 9, wherein the circuit chip has a substantially square shape.

12. The RFID tag according to claim 11, wherein the corners of the circuit chip in the square shape are chamfered.

13. The RFID tag according to any one of claims 2 to 9, wherein the circuit chip is mounted on the main surface of the tag sheet with the first main surface faced against the main surface of the tag sheet.

14. The RFID tag according to any one of claims 2 to 9, wherein the circuit chip is mounted on the main surface of the tag sheet with the second main surface faced against the main surface of the tag sheet.

15. An ID card having an RFID function internally containing the RFID tag according to any one of claims 1 to 9.

16. The RFID tag according to claim 1,
wherein the bar antenna is comprised of a dipole antenna.

17. The RFID tag according to claim 1,
wherein the RFID tag is configured to operate with carrier waves having a frequency greater than 30 MHz.

* * * * *